United States Patent Office 3,280,448
Patented Oct. 25, 1966

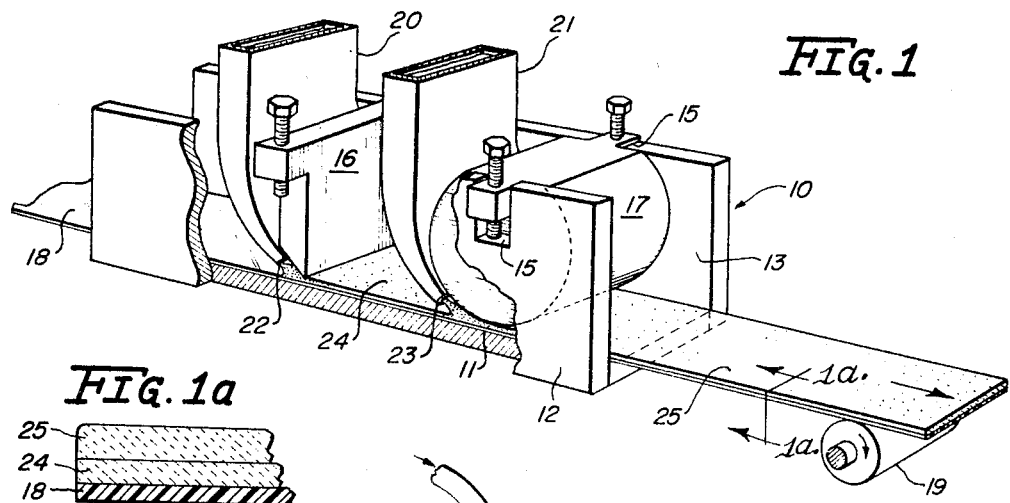
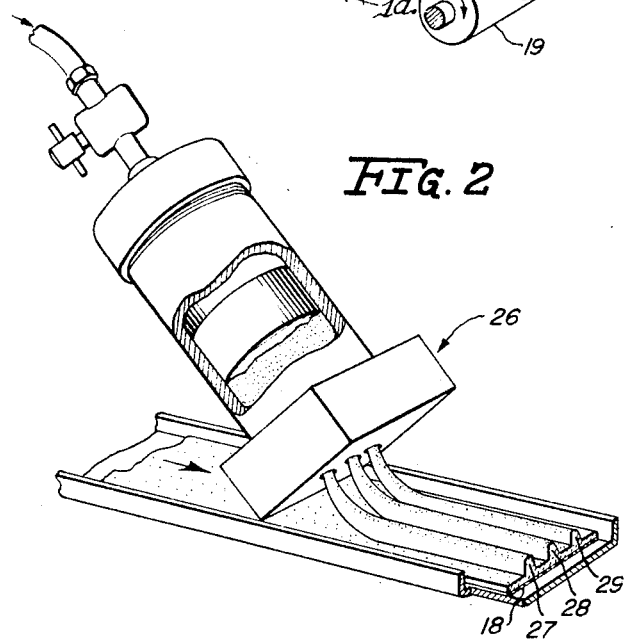
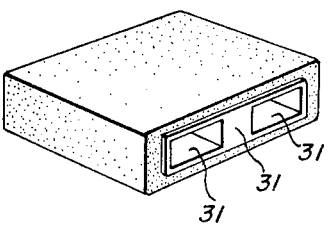
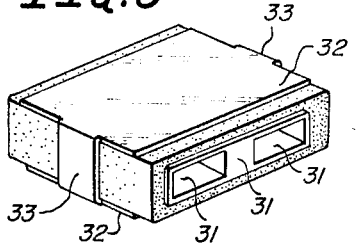
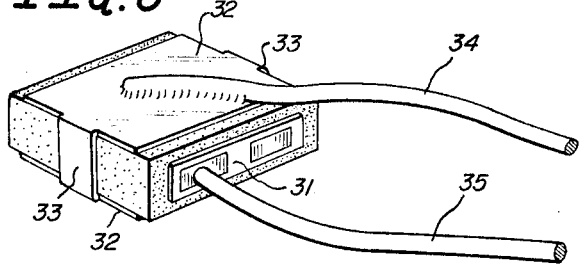
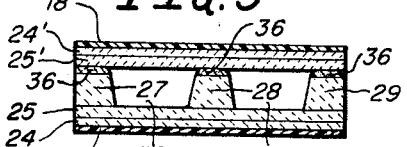

3,280,448
PROCESS FOR FABRICATING MINIATURE
CAPACITORS
Edwin J. Brajer, Arlington Heights, Ill., assignor to
Zenith Radio Corporation, a corporation of Delaware
Filed Nov. 2, 1961, Ser. No. 149,577
2 Claims. (Cl. 29—25.42)

This invention relates to electrical capacitors and particularly to small high capacity units of the type used in transistor radios and similar electronic devices where miniaturizing is desirable.

One type of capacitor which is presently in use is constructed of two ceramic sheets or discs which are joined together with a central electrode to form two capacitors in parallel. In the past, the separate ceramic sheets have been fired to ceramic maturity, inspected and electroded separately, and then joined. With this technique the components of the ceramic capacitor are handled a great number of times.

Miniaturized capacitors of the above type may also frequently have pinholes in their dielectric layers thus reducing the dielectric resistance to voltage breakdown.

Accordingly, it is an object of this invention to provide an improved process for fabricating miniature capacitors.

It is a specific object of the invention to provide a simplified and inexpensive process of fabrication for miniature capacitors.

It is still another object of this invention to provide a method of optimizing the voltage breakdown properties of a capacitor having a solid dielectric.

It is yet another object of this invention to provide a method of minimizing capacity variation due to temperature changes.

In accordance with the present invention, a process for fabricating a miniature capacitor includes providing a two layer dielectric structure, each of the layers having opposed major surfaces with spacer elements between the interior major surfaces. The layers and spacer elements are merged into a unitary composite structure having an inner cavity and thereafter the structure is provided with electrodes on its major outer surfaces and the walls of its inner cavity.

The invention further provides a novel method of optimizing the voltage breakdown properties of a capacitor having a solid dielectric, the method comprising eliminating pinholes through the dielectric by constituting it of a plurality or randomly oriented directly superposed sub-layers.

The features of the present invention which are believed to be novel are set forth with particularity in the appended claims. The invention, together with further objects and advantages thereof, may best be understood by reference to the following description taken in connection with the accompanying drawing, in the several figures of which like reference numerals identify like elements, and in which:

FIGURE 1 is a perspective view partially cut away of a device used for preparing dielectric layers;

FIGURE 1a is a cross-sectional view of the completed dielectric layer;

FIGURE 2 is a perspective view of apparatus for performing a step of the inventive process;

FIGURE 3 is a cross-sectional view of a single composite dielectric structure;

FIGURE 4 is a perspective view of the structure of FIGURE 3 showing the placement of an electrode in its interior cavity;

FIGURE 5 is a perspective view of the structure of FIGURE 4 showing the placement of exterior electrodes; and FIGURE 6 is a perspective view of a completed miniaturized capacitor including electrode leads.

In accordance with the invention, the process includes the provision of a two-layer dielectric structure, each of the layers having opposed major surfaces with spacer elements between the interior major surfaces. In a preferred embodiment of the invention, each of the component dielectric layers is prepared separately by a subsidiary process which optimizes the voltage breakdown properties of the dielectric layer by eliminating pinholes.

The specific apparatus to achieve the above subsidiary process is shown in FIGURE 1 and includes a U-shaped metal frame 10 comprising a base 11 and sidewalls 12 and 13. These walls have opposed pairs of slots 14 (not shown) and 15 which are adapted to receive T-shaped blades 16 and 17, the arms of the T of each blade meshing with respective slot pairs 14 and 15. Each blade has its bottom edge spaced a predetermined distance above base 11.

The above apparatus coats a base sheet 18 with two or more successive layers of undensified ceramic paint. More specifically, a thin sheet of base material 18, which may be composed of a polyester film such as Mylar plastic, a trademark of Du Pont, is threaded under a doctor blade 16 and another doctor element 17 and connected to a driving roller 19 which is turned at a relatively slow rate to move sheet 18 in a direction indicated by the arrow. The ceramic paint is loaded in two hoppers 20 and 21 which have outlet nozzles 22 and 23 behind doctor elements 16 and 17 respectivley. As sheet 18 is pulled underneath the doctor elements it receives a first coat of ceramic paint 24 as it passes under blade 16 and a second coat 25 as it passes under doctor element 17. The doctor elements are set a sufficient distance apart to allow a sufficient time interval for first coat 24 to partially dry before second coat 25 is applied over it. The height of doctor element 17 above base 11 is greater than the space between the bottom of doctor blade 16 and base 11 to allow the second coat of ceramic paint to be placed over the first coat.

The completed dielectric layer is shown in FIGURE 1a which illustrates the plastic base sheet 18 with two coats, 24 and 25, of ceramic paint. The above process thus eliminates pinholes through the dielectric layer by constituting it of a plurality of randomly oriented directly superposed sub-layers.

Merely by way of illustration and in no sense by way of limitation, a ceramic paint which was found to give exemplary performance in the above process is composed of the following ingredients and should be mixed as described below:

500 grams of powder:
    402 grams barium titanate
    45 grams strontium titanate
    52 grams calcium zirconate
    2.5 grams lanthanum oxide
    7.5 grams titanium dioxide
    2.1 grams cobalt titanate
200 grams of Varnish I (see below)
5 grinding balls in quart porcelain jar.
Mix on 20 revolutions per minute rolls for 70 hours or more.

Viscosity should be 118,000 to 122,000 centipoises. Varnish I has the following formulae and procedures:
    67 grams low viscosity polyvinyl butyral resin; for example, Butvar from Shawinigan Resins Corp.
325 cubic centimeters toluene.
Put material in jar and mix on ballmill at 40 revolutions per minute until dissolved.
Viscosity should be 21,000 to 23,000 centipoises (Brookfield Viscosimeter).

Add 1 cubic centimeter alkyl phenyl polyethylene glycol ether; for example Tergitol NP14 from Union Carbide and Carbon Corp.

Mix 15 minutes on same ballmill.

Add 110 cubic centimeters polyalkylene glycol having a viscosity of 600 to 700 Saybolt Seconds at 100° F.; for example Ucon oil HB660 from Union Carbide and Carbon Corp.

Add 40 cubic centimeters polyalkylene glycol having a viscosity of approximately 2000 Saybolt Seconds at 100° F.; for example Ucon oil HB2000 from Union Carbide and Carbon Corp.

Mix until free of lumps.

Viscosity should be 6,000 to 8,000 centipoises.

After the base sheet 18 has been given the two successive layers of undensified ceramic paint as described above, spacer elements or ribs which will support another dielectric sheet are applied to the coated sheet. The application of the ribs to coated base sheet 18 is shown in FIGURE 2. There, an extruder 26 is supplied with a ceramic paint similar to that used for the base sheet coating but with a higher viscosity. Compressed air extrudes the ceramic into a cylindrical shape similar to spaghetti. Three separate ribs 27, 28, and 29 are laid on the coated surface of base sheet 18 as shown in FIGURE 2. If desired an alternative process may be used where the spacer elements are concurrently formed with the upper coat 25 of ceramic paint.

A two-layer dielectric structure having opposed major surfaces with spacer elements between the interior major surfaces is provided by preparing a second coated base sheet 18', 24', 25' similar to sheet 18, 24, 25 and juxtaposing its painted surface on ribs 27, 28, and 29 as shown in FIGURE 3. Before the application of sheet 18' to base sheet 18, ribs 27–29 are coated with a layer 36 of an appropriate type of adhesive such as Varnish I to hold the structure together. The above juxtaposition of ceramic coated sheets also forms an inner cavity 30 which, as shown in FIGURE 3, is divided by center rib 28.

If it is desired to stabilize the variation of capacity with temperature, the second dielectric sheet 24', 25' may have a different temperature coefficient of capacity so that the over-all additive capacity will show a greater stability than that of either sheet by itself. For example, one sheet may be of a composition with a maximum of capacity at approximately 35° C. and the other sheet with a maximum capacity at 50° C. With the illustrative materials mentioned above, the capacity of each individual ceramic layer may be varied by changing the amount of calcium zirconate in the ceramic paint.

The two-layer structure shown in FIGURE 3 has been trimmed to remove excess ceramic which extended past ribs 27 and 29 as shown in FIGURE 2 and also has had the plastic base sheets removed. Both of these steps are accomplished after the structure has been dried to give it some rigidity. In addition to trimming the sides of the structure, it is also cut lengthwise into rectangular components of a predetermined size as shown in FIGURE 4. The size, of course, is determined by the ultimate value of capacitance which will be required, capacity being directly proportional to the area of the dielectric.

The component structure is next merged into a unitary composite structure by firing it in a batch or a tunnel-type furnace. In other words, the ceramic material is fired to ceramic maturity to densify it. For the illustrative composition given, a temperature of at least 2500° F. is necessary.

After the components have been fired, electrodes are provided on the major outer surfaces of the structure and the walls of the inner cavity. Most conveniently, the entire inner cavity 30 is coated with silver electrode paint 31 as shown in FIGURE 4, while both major outside surfaces are provided with silver coated electrodes as shown in FIGURE 5.

The two outer electrodes 32 are preferably conductively connected by a pair of integral silver strips 33, as shown in FIGURE 5, to enable the composite structure to be utilized as two capacitors in parallel. The structure as shown in FIGURE 5 is now a completed capacitor.

The final step of the process is the provision of leads for the capacitor. This is shown in FIGURE 6 where a lead 34 is soldered or cemented to electrode 32 and a lead 35 is soldered or cemented in inner cavity 30.

Thus, the invention provides a simplified and inexpensive process for fabrication of miniature capacitors and in addition provides a capacitor with a dielectric layer having optimum voltage breakdown properties and minimum capacity variation with temperature. Certain aspects of the invention as herein disclosed are specifically claimed in a copending divisional application of Edwin J. Brajer, Serial No. 410,575 filed November 12, 1964, and assigned to the same assignee as the present application.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A method of manufacturing a ceramic capacitor having optimized breakdown voltage properties including the following steps:
    coating a base sheet with a first coat of liquid dielectric material;
    partially drying said first coat of liquid dielectric material;
    thereafter applying a second coat of liquid dielectric material over said partially dried first coat;
    concurrently firing said first and second coats of liquid dielectric material to ceramic maturity to constitute a unitary ceramic dielectric layer substantially free of pinholes; and
    applying conductive electrodes to opposite surfaces of said unitary ceramic dielectric layer.

2. A method of optimizing the voltage breakdown properties of a capacitor having a solid dielectric layer by eliminating pinholes through the layer, which method includes the following steps:
    coating a base sheet with a first coat of undensified ceramic paint;
    partially drying said first coat of undensified ceramic paint;
    applying a second coat of the same undensified ceramic paint over said partially dried first coat;
    drying said two coats of ceramic paint to form a rigid two-layer structure;
    removing said base sheet;
    firing said two-layer structure to ceramic maturity to form a unitary ceramic dielectric element; and
    applying conductive electrodes to opposite surfaces of said unitary ceramic dielectric element.

References Cited by the Examiner
UNITED STATES PATENTS

| | | | |
|---|---|---|---|
| 2,697,670 | 12/1954 | Gaudenzi et al. | 117—129 |
| 2,703,772 | 3/1955 | Keithly. | |
| 2,858,235 | 10/1958 | Rex | 117—129 |
| 2,903,780 | 9/1959 | Barnard et al. | 29—25.42 |
| 2,972,180 | 2/1961 | Gulton et al. | 29—25.42 |
| 2,973,287 | 2/1961 | McBride | 117—138.8 |
| 2,976,184 | 3/1961 | Blatz | 117—138.8 |
| 3,091,548 | 5/1963 | Dillon | 117—129 |

EARL M. BERGERT, *Primary Examiner.*

LEON PEAR, *Examiner.*

H. F. EPSTEIN, *Assistant Examiner.*